United States Patent
Michels et al.

(10) Patent No.: US 8,103,809 B1
(45) Date of Patent: Jan. 24, 2012

(54) NETWORK DEVICES WITH MULTIPLE DIRECT MEMORY ACCESS CHANNELS AND METHODS THEREOF

(75) Inventors: Timothy Michels, Greenacres, WA (US); William R. Baumann, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 65 days.

(21) Appl. No.: 12/689,911

(22) Filed: Jan. 19, 2010

Related U.S. Application Data

(60) Provisional application No. 61/205,387, filed on Jan. 16, 2009.

(51) Int. Cl.
*G06F 13/28* (2006.01)

(52) U.S. Cl. .................. 710/22; 710/26; 710/27

(58) Field of Classification Search ........... 710/22, 710/26, 27
See application file for complete search history.

(56) References Cited

U.S. PATENT DOCUMENTS

| | | | |
|---|---|---|---|
| 5,941,988 A | 8/1999 | Bhagwat et al. | |
| 6,026,443 A * | 2/2000 | Oskouy et al. | 709/230 |
| 6,700,871 B1 | 3/2004 | Harper et al. | |
| 6,748,457 B2 | 6/2004 | Fallon et al. | |
| 6,820,133 B1 | 11/2004 | Grove et al. | |
| 7,065,630 B1 | 6/2006 | Ledebohm et al. | |
| 7,107,348 B2 | 9/2006 | Shimada et al. | |
| 7,142,540 B2 | 11/2006 | Hendel et al. | |
| 7,281,030 B1 * | 10/2007 | Davis | 709/212 |
| 7,324,525 B2 | 1/2008 | Fuhs et al. | |
| 7,376,772 B2 | 5/2008 | Fallon | |
| 7,403,542 B1 | 7/2008 | Thompson | |
| 7,420,931 B2 | 9/2008 | Nanda et al. | |
| 7,478,186 B1 | 1/2009 | Onufryk et al. | |
| 7,496,695 B2 | 2/2009 | Go et al. | |
| 7,500,028 B2 | 3/2009 | Yamagishi | |
| 7,647,416 B2 | 1/2010 | Chiang et al. | |
| 7,735,099 B1 * | 6/2010 | Micalizzi, Jr. | 719/328 |
| 7,742,412 B1 * | 6/2010 | Medina | 370/231 |
| 7,784,093 B2 | 8/2010 | Deng et al. | |

(Continued)

FOREIGN PATENT DOCUMENTS

EP    1813084 A1    8/2007

(Continued)

OTHER PUBLICATIONS

Bell Laboratories, "Layer 4/7 Switching and Other Custom IP Traffic Processing Using the NEPPI API," Bell Laboratories, Lucent Technologies, Murray Hill, NJ 07974 USA, pp. 1-11 (2000).

(Continued)

*Primary Examiner* — Alford Kindred
*Assistant Examiner* — David Martinez
(74) *Attorney, Agent, or Firm* — LeClairRyan, a Professional Corporation

(57) ABSTRACT

A method, computer readable medium, and a system for communicating with networked clients and servers through a network device includes establishing a plurality of direct memory access (DMA) channels across a host system bus over which a plurality of executing applications each having a respective application driver communicate with a network through a network device configured to receive and transmit network data packets. At a first port in the network device, a first network data packet destined for an executing application is received. A first DMA channel over which to transmit the first network data packet towards the destined executing application is identified, and the first network data packet is transmitted to the destination executing application over the designated DMA channel mapping to the first port.

33 Claims, 7 Drawing Sheets

U.S. PATENT DOCUMENTS

| | | | |
|---|---|---|---|
| 7,877,524 B1 | | 1/2011 | Annem et al. |
| 2002/0143955 A1* | | 10/2002 | Shimada et al. ............ 709/227 |
| 2003/0067930 A1* | | 4/2003 | Salapura et al. ............ 370/412 |
| 2003/0204636 A1 | | 10/2003 | Greenblat et al. |
| 2004/0249948 A1 | | 12/2004 | Sethi et al. |
| 2005/0083952 A1* | | 4/2005 | Swain ........................ 370/401 |
| 2006/0104303 A1 | | 5/2006 | Makineni et al. |
| 2006/0221832 A1 | | 10/2006 | Muller et al. |
| 2006/0221835 A1 | | 10/2006 | Sweeney |
| 2008/0126509 A1* | | 5/2008 | Subramanian et al. ....... 709/214 |
| 2009/0016217 A1 | | 1/2009 | Kashyap |

FOREIGN PATENT DOCUMENTS

| | | |
|---|---|---|
| WO | 2006/055494 A1 | 5/2006 |

OTHER PUBLICATIONS

Http://lwn.net/images/pdf/LDD3/ch15.pdf, "Memory Mapping and DMA," Chapter 15, pp. 412-463 (Jan. 2005).

EVENTHELIX.com, "DMA and Interrupt Handling," at http://www.eventhelix.com/RealtimeMantra/FaultHandling/dma_interrupt_handling.htm (Downloaded Oct. 2009).

EVENTHELIX.com, "TCP-Transmission Control Protocol (TCP Fast Retransmit and Recovery)," (Mar. 2002).

Harvey, "DMA Fundamentals on Various PC Platforms," National Instruments, Application Note 011, pp. 1-18 (Apr. 1991).

Mangino, "Using DMA with High Performance Peripherals to Maximize System Performance," WW TMS470 Catalog Applications, at http://focus.ti.com/lit/wp/spna105/spna105.pdf (Jan. 2007).

Mogul, "The Case for Persistent-Connection HTTP," SIGCOMM, Cambridge, MA USA pp. 299-313 (Oct. 1995).

Rabinovich et al., "DHTTP: An Efficient and Cache-Friendly Transfer Protocol for the Web," IEEE/ACM Transactions on Networking 12(6):1007-20 (Dec. 2004).

Stevens, "TCP Slow Start, Congestion Avoidance, Fast Retransmit, and Fast Recovery Algorithms," Standards Track Memo pp. 1-6 (Jan. 1997).

Wadge, "Achieving Gigabit Performance on Programmable Ethernet Network Interface Cards," pp. 1-9 (May 2001).

Welch, "A User's Guide to TCP Windows," pp. 1-5 (Jun. 1996).

Wikipedia, "Direct Memory Access," at http://en.wikipedia.org/wiki/Direct_memory_access, pp. 1-6 (Downloaded Oct. 2009).

Wikipedia, "Nagle's Algorithm," at Nagle's Algorithm—Wikeopedia.xps (Last Modified Oct. 2009).

Cavium Networks, "Cavium Networks—Products > Acceleration Boards > PCI, PCI-X," at http://www.cavium.com/acceleration_boards_PCI_PCI-X.htm (Downloaded Oct. 2008).

Cavium Networks, "Nitrox™ XL Security Acceleration Modules PCI 3V or 3V/5V-Universal Boards for SSL and IPSec," at http://www.Caviumnetworks.com, (2002) pp. 1, Cavium Networks, Mountain View, CA USA.

Cavium Networks, "Cavium Networks Product Selector Guide—Single & Multi-Core MIPS Processors, Security Processors and Accelerator Boards—Spring 2008," (2008) pp. 1-44, Cavium Networks, Mountain View, CA US.

COMTECH AHA Corporation, "Comtech Aha Announces 3.0 Gbps GZIP Compression/ Decompression Accelerator AHA362-PCIX offers high-speed GZIP compression and decompression," www.aha.com, (Apr. 20, 2005) pp. 1-2, Comtech AHA Corporation, Moscow, Idaho USA.

COMTECH AHA Corporation, "COMTECH AHA Announces GZIP Compression and Decompression IC Offers the highest speed and compression ratio performance in hardware on the market," www.aha.com, (Jun. 26, 2007) pp. 1-2, Comtech AHA Corporation, Moscow, Idaho USA.

"Plan 9 kernel history: overview / file list / diff list,"<http://switch.corn/cgi-bin/plan9history.cgi?f=2001/0126/pc/etherga620.com>, accessed Oct. 22, 2007, pp. 1-16.

"Gigabit Ethernet/PCI Network Interface Card; Host/NIC Software Interface Definition," Jul. 1999, pp. 1-80, Revision 12.4.13, P/N. 020001, Alteon WebSystems, Inc., San Jose, California.

* cited by examiner

US 8,103,809 B1

NETWORK DEVICES WITH MULTIPLE DIRECT MEMORY ACCESS CHANNELS AND METHODS THEREOF

CROSS REFERENCE TO RELATED APPLICATIONS

This application claims the benefit of U.S. Provisional Patent Application Ser. No. 61/205,387, filed on Jan. 16, 2009, entitled "Network Interface Systems with Multiple Direct Memory Access Channels and Methods Thereof," which is hereby incorporated by reference in its entirety.

FIELD

Various aspects of the technology disclosed herein generally relate to data processing in a server-based network, and more particularly, to a network device with multiple direct memory access channels.

BACKGROUND

The use of server-based applications from remote clients over a network has become ubiquitous. With the widespread use of diverse server applications, different needs for input devices such as a network interface controller for data received through the network to the server have arisen. Various applications that use data stored in server memory interrupt the processor when they need to access the data. Since interrupts to a processor for accessing data are computationally expensive, it is desirable to interrupt a processor on a server only when necessary. By way of example only, one type of application uses data protocols (e.g., File Transfer Protocol (FTP) or Hyper Text Transfer Protocol (HTTP)) with high throughput where it is possible to receive and store large numbers of packets before sending to a processor to handle the packets. In this case, many packets may be collected over the network and may be coalesced before sending to the processor.

Some types of data can involve numerous accesses because acknowledgements can be sent before sending the next amount of data over a network. Based on current network data transfer protocols such as the Common Internet File Sharing (CIFS) protocol or the Network File Sharing (NFS) protocol, data files are typically broken up into different requests to send smaller increments of the data file due to the local area network protocols for file transfer that are adapted to wide area networks. In such a situation, the client requesting the data file will issue a single request for the first part of the requested file and wait for an acknowledgement and then issue a subsequent request and so forth until the data file is received. Thus, it is desirable for a receiving server processor to handle packets frequently to decrease latency time.

Recently, servers have been expanded to run multiple diverse applications on different processors. Such different applications may handle different types of data and conventional network interface controllers create an inefficient handling of different types of data packets they are not optimally configured for. For example, a network interface controller configured for high throughput data such as HTTP will create unacceptably high latency periods due to the interrupt coalescing when handling CIFS packets. Conversely, a network interface controller configured for low latency data such as CIFS packets will create high switching overhead and processing time by sending unnecessary interrupts, thus reducing throughput when handling HTTP packets.

Current network interface controller devices present themselves as single monolithic devices to system software. Such network interface controller devices are managed by a single device driver, which is common to all applications, that accesses the direct memory access channel in a host computer system. In emerging virtualized systems with multi-core, multi-operating system, and/or multi-application architectures, the current network interface controller devices have certain inefficiencies. For example, access to the network interface controller device is handled by a single device driver, with access controlled by a hypervisor or similar supervising piece of software. The single device driver accessing direct memory access (DMA) channels by way of a supervising software or hardware becomes both a performance bottle neck and contributor to system and software complexity, and thus, leads to inefficiencies in virtualized systems.

SUMMARY

According to an example, a method for communicating with networked clients and servers through a network device includes establishing a plurality of direct memory access (DMA) channels across a host system bus over which a plurality of executing applications each having a respective application driver communicate with a network through a network device configured to receive and transmit network data packets. At a first port in the network device, a first network data packet destined for an executing application is received. A first DMA channel over which to transmit the first network data packet towards the destined executing application is identified, and the first network data packet is transmitted to the destination executing application over the designated DMA channel mapping to the first port.

According to another example, a computer readable medium having stored thereon instructions for communicating with networked clients and servers through a network device includes machine executable code which when executed by at least one processor, causes the processor to perform steps including establishing a plurality of direct memory access (DMA) channels across a host system bus over which a plurality of executing applications each having a respective application driver communicate with a network through a network device configured to receive and transmit network data packets. At a first port in the network device, a first network data packet destined for an executing application is received. A first DMA channel over which to transmit the first network data packet towards the destined executing application is identified, and the first network data packet is transmitted to the destination executing application over the designated DMA channel mapping to the first port.

According to yet another example, an application delivery controller includes one or more processors, a memory coupled to the one or more processors by a bus, and a network interface controller coupled to the one or more processors and the memory and configured to be capable of receiving and forwarding data packets from a network that relate to a plurality of applications, and at least one of the one or more processors configured to execute programmed instructions stored in the memory and the network interface controller with logic configured to implement establishing a plurality of direct memory access (DMA) channels across a host system bus over which a plurality of executing applications each having a respective application driver communicate with a network through a network device configured to receive and transmit network data packets. At a first port in the network device, a first network data packet destined for an executing application is received. A first DMA channel over which to transmit the first network data packet towards the destined executing application is identified, and the first network data packet is transmitted to the destination executing application over the designated DMA channel mapping to the first port.

The examples provide numerous advantages. For example, since each application executing on a host processor has its own application driver independent from other application drivers, unique DMA channels can be allotted to each network packet received for a particular application. As a result, each network packet associated with the corresponding executing applications is treated as if it had its own independent traffic management device (e.g., an application delivery controller). Individual DMA channels can be configured for individual applications and operating systems without the knowledge or interference from other DMA channels with associated applications, drivers and operating systems. This is advantageous because it reduces both performance bottle neck and system and software complexity, and thus, leads to an efficient network virtualization system. Further, by way of example only, since each DMA channel has a unique application and driver, failure of one DMA channel does not affect the whole system and can be dealt with by not having to bring all the DMA channels down, thereby increasing fault tolerance of the network system.

DETAILED DESCRIPTION

Figure 1A:
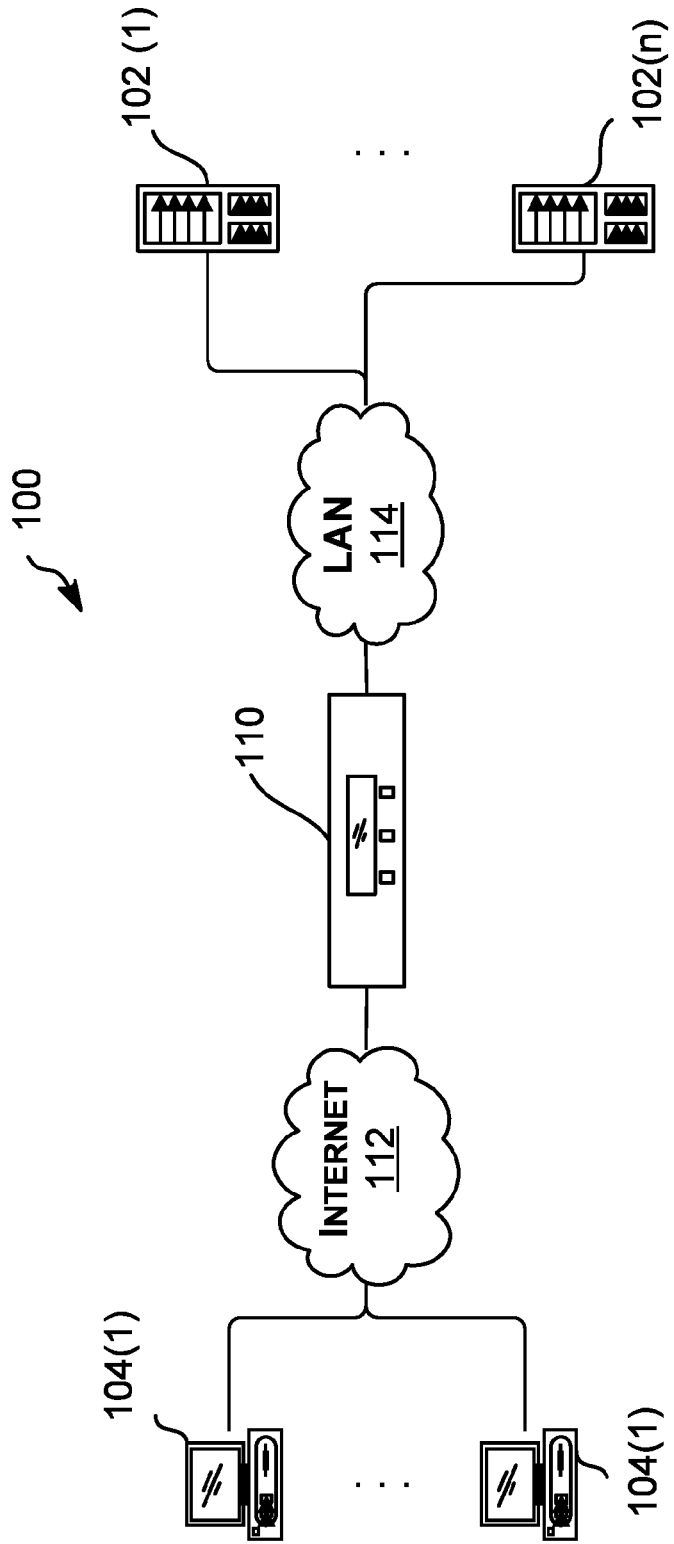
FIG. 1A is a block diagram of a network environment including an application delivery controller to manage network data packets.

Referring to FIG. 1A, an exemplary network system 100 using a multiple DMA channel based application delivery controller 110 that can provide multiple independently resettable DMA channels for independent applications and unique drivers associated with those applications is depicted. The application delivery controller 110 can communicate with networked clients and servers through a network device, in addition to other functions such as increasing network quality of service for packets with connection state to servers 102(1) to 102(n) and allowing processing packets on a priority determined based on classification of service. A network 112 can provide responses and requests according to the HTTP-based application request for comments (RFC) protocol or the Common Internet File System (CIFS) or network file system (NFS) protocol in this example, but the principles discussed herein are not limited to these examples and can include other application protocols. The system 100 can include a series of one or more client devices such as client computers 104(1) to 104(n) (also interchangeably referred to as client devices, client computing devices, client systems, client computing systems, or clients), and an application delivery controller 110 coupling the servers 102(1) to 102(n) to the client devices 104(1) to 104(n) through the network 112. For clarity and brevity, in FIG. 1A two server devices 102(1) and 102(n) are shown, but it should be understood that any number of server devices can use the exemplary network system 100. Likewise, two client devices 104(1)-104(n) are shown in FIG. 1A, but any number of client devices can also use the exemplary network system 100 as well. The ellipses and the designation "n" in FIG. 1A denote an unlimited number of server devices and client devices, respectively.

Servers 102(1)-102(n) comprise one or more server computing machines capable of operating one or more Web-based applications that may be accessed by network devices in the network 112, such as client devices 104(1)-104(n) (also referred to as client computers 104(1)-104(n)), via application delivery controller 110, and may provide other data representing requested resources, such as particular Web page(s), image(s) of physical objects, and any other objects, responsive to the requests, although the servers 102(1)-102(n) may perform other tasks and provide other types of resources. It should be noted that one or more of the servers 102(1)-102(n) may be a cluster of servers managed by a network traffic management device such as application delivery controller 110.

The client computers 104(1)-104(n) in this example can run interface applications such as Web browsers that can provide an interface to make requests for and send data to different Web server-based applications via the network 112. A series of applications can run on the servers 102(1)-102(n) that allow the transmission of data that is requested by the client computers 104(1)-104(n). The servers 102(1)-102(n) can provide data or receive data in response to requests directed toward the respective applications on the servers 102(1)-102(n) from the client computers 104(1)-104(n). As per the TCP, packets can be sent to the servers 102(1)-102(n) from the requesting client computers 104(1)-104(n) to send data. It is to be understood that the servers 102(1)-102(n) can be hardware or software or can represent a system with multiple servers, which can include internal or external networks. In this example the servers 102(1)-102(n) can be any version of Microsoft° IIS servers or Apache® servers, although other types of servers can be used. Further, additional servers can be coupled to the network 112 and many different types of applications can be available on servers coupled to the network 112.

Generally, the client devices such as the client computers 104(1)-104(n) can include virtually any computing device capable of connecting to another computing device to send and receive information, including Web-based information. The set of such devices can include devices that typically connect using a wired (and/or wireless) communications medium, such as personal computers (e.g., desktops, laptops), mobile and/or smart phones and the like. In this example, the client devices can run Web browsers that can provide an interface to make requests to different Web server-based applications via the network 112. A series of Web-based applications can run on the application servers 102(1)-102(n) that allow the transmission of data that is requested by the client computers 104(1)-104(n). The client computers 104(1)-104(n) can be further configured to engage in a secure communication with the application delivery controller 110 and/or the servers 102(1)-102(n) using mechanisms such as Secure Sockets Layer (SSL), Internet Protocol Security (IPSec), Tunnel Layer Security (TLS), and the like.

In this example, the network 112 comprises a publicly accessible network, such as the Internet, which includes client computers 104(1)-104(n), although the network 112 may comprise other types of private and public networks that include other devices. Communications, such as requests from client computers 104(1)-104(n) and responses from servers 102(1)-102(n), take place over the network 112 according to standard network protocols, such as the HTTP and TCP/IP protocols in this example, but the principles discussed herein are not limited to this example and can include other protocols. Further, the network 112 can include local area networks (LANs), wide area networks (WANs), direct connections and any combination thereof, other types and numbers of network types. On an interconnected set of LANs or other networks, including those based on different architectures and protocols, routers, switches, hubs, gateways, bridges, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the network 112 includes any communication medium and method by which data may travel between client devices 104(1)-104(n), servers 102(1)-102(n) and application delivery controller 110, and these examples are provided by way of example only.

Each of the servers 102(1)-102(n), application delivery controller 110, and client computers 104(1)-104(n) can include a central processing unit (CPU), controller or processor, a memory, and an interface system which are coupled together by a bus or other link, although other numbers and types of each of the components and other configurations and locations for the components can be used. Since these devices are well known to those skilled in the relevant art(s), they will not be described in further detail herein.

In addition, two or more computing systems or devices can be substituted for any one of the systems in the network system 100. Accordingly, principles and advantages of distributed processing, such as redundancy, replication, and the like, also can be implemented, as appropriate, to increase the robustness and performance of the devices and systems of the network system 100. The network system 100 can also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

LAN 114 comprises a private local area network that includes the application delivery controller 110 coupled to the one or more servers 102(1)-102(n), although the LAN 114 may comprise other types of private and public networks with other devices. Networks, including local area networks, besides being understood by those skilled in the relevant arts, have already been generally described above in connection with network 112, and thus will not be described further here.

As shown in the example environment of network system 100 depicted in FIG. 1A, the application delivery controller 110 can be interposed between the network 112 and the servers 102(1)-102(n) in LAN 114 as shown in FIG. 1A. Again, the network system 100 could be arranged in other manners with other numbers and types of devices. Also, the application delivery controller 110 is coupled to network 112 by one or more network communication links and intermediate network devices, such as routers, switches, gateways, hubs and other devices (not shown). It should be understood that the devices and the particular configuration shown in FIG. 1A are provided for exemplary purposes only and thus are not limiting in number or type.

Generally, the application delivery controller 110 is an exemplary network traffic management device that performs managing network communications, which may include managing one or more client requests and server responses, from/to the network 112 between the client devices 104(1)-104(n) and one or more of the servers 102(1)-102(n) in LAN 114 in these examples. An example application delivery controller 110 can be the BIG-IP® device provided by F5 networks, Inc. of Seattle, Wash. These requests may be destined for one or more servers 102(1)-102(n), and, as alluded to earlier, may take the form of one or more TCP/IP data packets originating from the network 112, passing through one or more intermediate network devices and/or intermediate networks, until ultimately reaching the application delivery controller 110, for example. In any case, the application delivery controller 110 may manage the network communications by performing several network traffic management related functions involving the communications, such as load balancing, access control, VPN hosting, network traffic acceleration, and applying quality of service levels to multiple direct memory access channels in accordance with the processes described further below in connection with FIGS. 1B-6, for example.

Figure 1B:
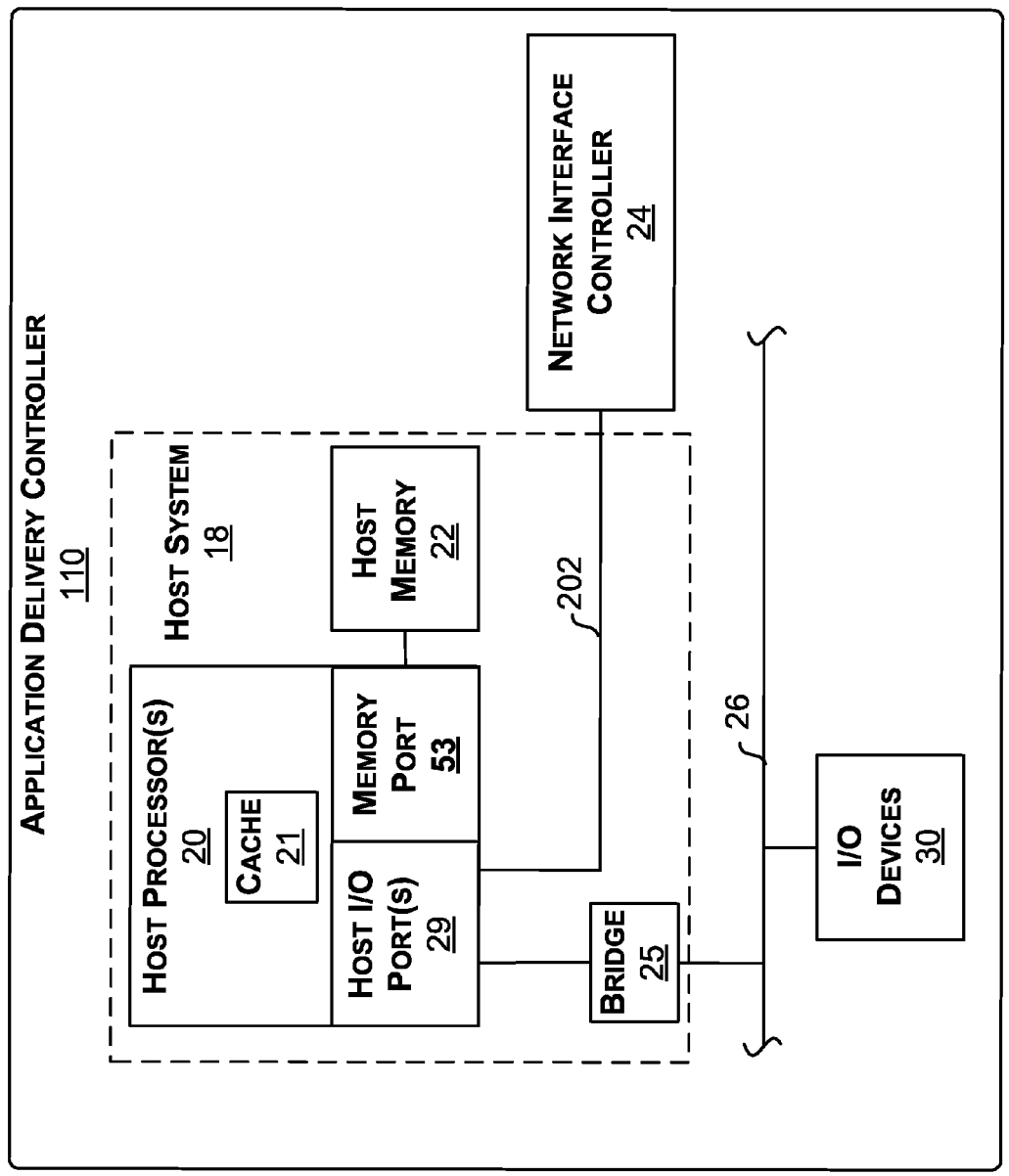
FIG. 1B is a partly functional and partly schematic diagram of an application delivery controller shown in FIG. 1A.

FIG. 1B illustrates the example application delivery controller 110 in more detail. Included within the application delivery controller 110 is a system bus 26 (also referred to as bus 26) that communicates with a host system 18 via a bridge 25 and with an I/O device 30. In this example, a single I/O device 30 is shown to represent any number of I/O devices connected to bus 26. In one example, bridge 25 is in further communication with a host processor 20 (also referred to as host system processor 20) via host I/O ports 29. Host processor 20 can further communicate with a network interface controller 24 (also referred to as network transceiver logic) via a CPU bus 202, a host memory 22 or host system memory 22 (via a memory port 53), and a cache memory 21. As outlined above, included within the host processor 20 are host I/O ports 29, memory port 53, and a main processor (not shown separately).

In one example, application delivery controller 110 can include the host processor 20 characterized by any one or more of the following component configurations: computer readable medium and logic circuits that respond to and process instructions fetched from the host memory 22; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits capable of executing the systems and methods described herein. Still other examples of the host processor 20 can include any combination of the following: a microprocessor, a microcontroller, a central processing unit with a single processing core, a central processing unit with two processing cores, or a central processing unit with more than one processing core.

In some examples, the application delivery controller 110 includes the host processor 20 that communicates with cache memory 21 via a secondary bus also known as a backside bus, while some other examples, the application delivery controller 110 includes the host processor 20 that communicates with cache memory via the system bus 26. The local system bus 26 can, in some examples, also be used by the host processor 20 to communicate with more than one type of I/O devices 30. In some examples, the local system bus 26 can be anyone of the following types of buses: a VESA VL bus; an ISA bus; an EISA bus; a Micro Channel Architecture (MCA) bus; a PCI bus; a PCI-X bus; a PCI-Express bus; or a NuBus. Other examples of the application delivery controller 110 include I/O device 30 that is a video display (not shown separately) that communicates with the host processor 20 via an Advanced Graphics Port (AGP).

Still other versions of the application delivery controller 110 include host processor 20 connected to an I/O device 30 via any one of the following connections: HyperTransport, Rapid I/O, PCI Express, or InfiniBand, although other types of connections may be used. Further examples of the application delivery controller 110 include a communication connection where the host processor 20 communicates with one I/O device 30 using a local interconnect bus and with a second I/O device (not shown separately) using a direct connection. Included within some examples of the application delivery controller 110 is each of host memory 22 and cache memory 21. The cache memory 21, will, in some examples, be any one of the following types of memory: SRAM; BSRAM; or EDRAM. Other examples include cache memory 21 and host memory 22 that can be anyone of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein.

The host memory 22 and/or the cache memory 21 can, in some examples, include one or more memory devices capable of storing data and allowing any storage location to be directly accessed by the host processor 20. Further examples include host processor 20 that can access the host memory 22 via one of either: system bus 26; memory port 53; or any other connection, bus or port that allows the host processor 20 to access host memory 22.

One example of the application delivery controller 110 provides support for anyone of the following installation devices: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can, in some examples, include a client agent, or any portion of a client agent. The application delivery controller 110 may further include a storage device (not shown separately) that can be either one or more hard disk drives, or one or more redundant arrays of independent disks; where the storage device is configured to store an operating system, software, programs applications, or at least a portion of the client agent. A further example of the application delivery controller 110 can include an installation device that is used as the storage device.

Furthermore, the application delivery controller 110 may include network interface controller 24 to communicate with LAN 114, a Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the application delivery controller 110 includes network interface controller 24 able to communicate with additional computing devices via any type and/or form of gateway or tunneling protocol such as Secure Socket Layer (SSL) or Transport Layer Security (TLS), or the Citrix Gateway Protocol manufactured by Citrix Systems, Inc. of Fort Lauderdale, Fla. Versions of the network interface controller 24 can comprise anyone of: a built-in network adapter; a network interface card (NIC); a PCMCIA network card; a card bus network adapter; a wireless network adapter; a USB network adapter; a modem; or any other device suitable for interfacing the application delivery controller 110 to a network, the application delivery controller being capable of and configured to perform the methods and implement the systems described herein.

In various examples, the application delivery controller 110 can include any one of the following I/O devices 30: a keyboard; a pointing device; a mouse; a gesture based remote control device; an audio device; track pads; an optical pen; trackballs; microphones; drawing tablets; video displays; speakers; inkjet printers; laser printers; and dye sublimation printers; or any other input/output device able to perform the methods and systems described herein. Host I/O ports 29 may in some examples connect to multiple I/O devices 30 to control the one or more I/O devices 30. Some examples of the I/O devices 30 may be configured to provide storage or an installation medium, while others may provide a universal serial bus (USB) interface for receiving USB storage devices such as the USB Flash Drive line of devices manufactured by Twintech Industry, Inc. Still other examples of an I/O device 30 may be bridge 25 between the system bus 26 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

Figure 2:
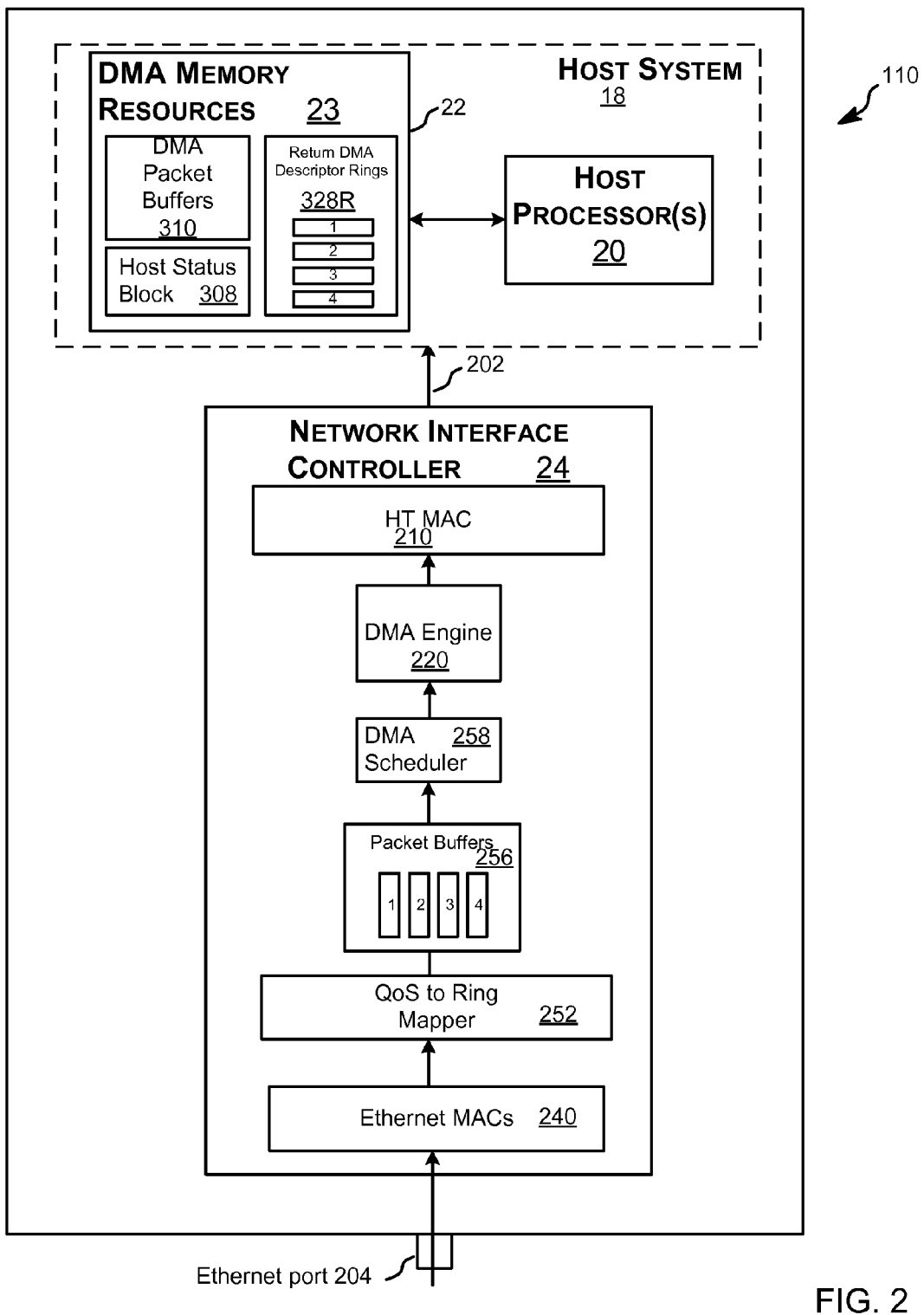
FIG. 2 is a diagram of a packet receive scenario handled by the application delivery controller of FIGS. 1A and 1B.

According to various examples, receive and transmit scenarios handled by the application delivery controller 110, will be described below with reference to FIGS. 2 and 3, respectively. For example, as explained below, FIG. 2 shows handling of one or more received network packets using respective independently resettable DMA channels by the network interface controller 24 and host system 18. Similarly, by way of example, as explained below, FIG. 3 shows transmission of one or more packets from application delivery controller 110 to servers 102(1)-102(n) and/or client computing devices 104(1)-104(n) over network 110 (and/or, LAN 114) using independently resettable DMA channels maintained by the network interface controller 24 and host system 18.

Example Receiving Data Packets from the Network (Return DMA Operation)

Figure 3:
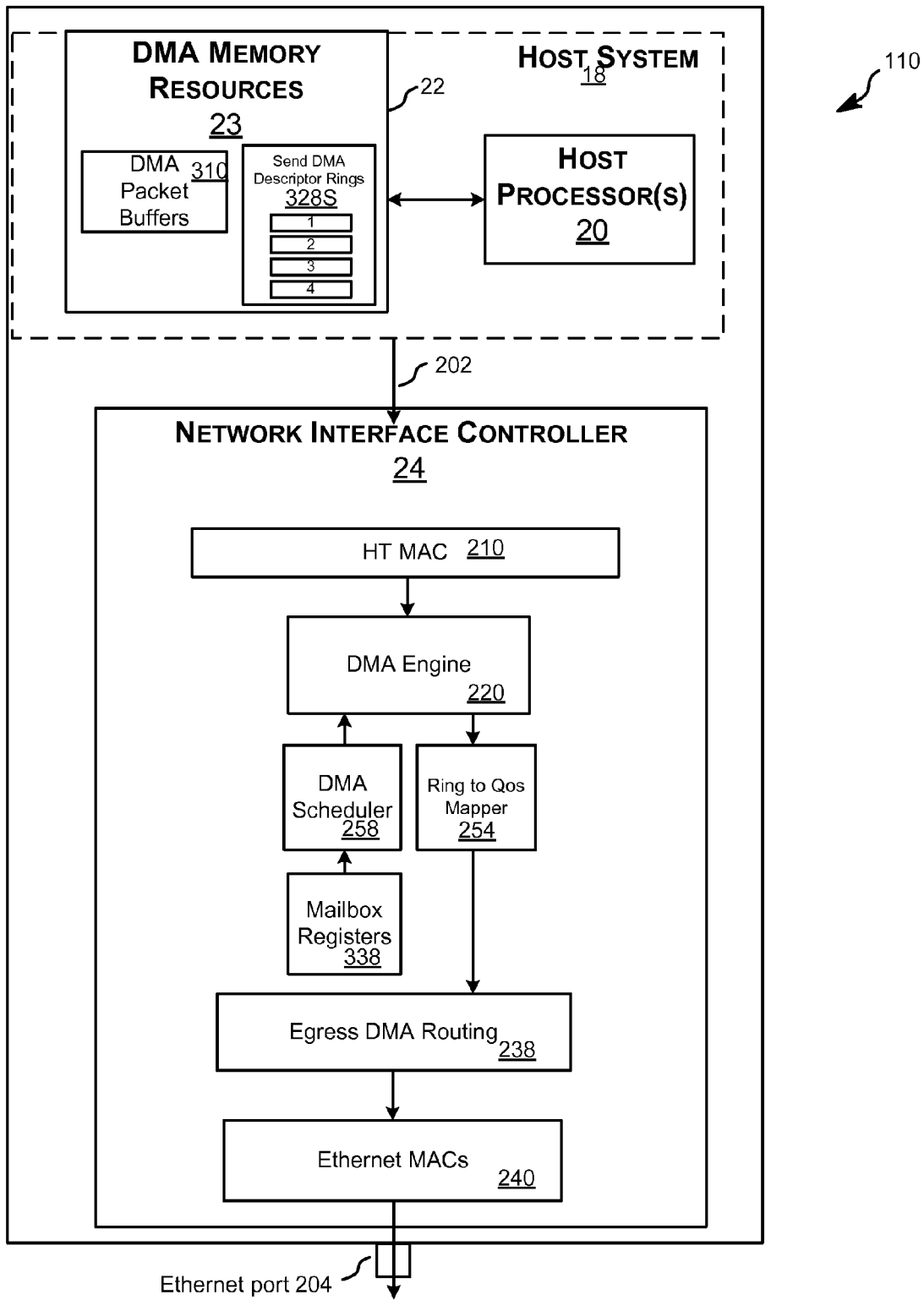
FIG. 3 is a diagram of a packet transmit scenario handled by the application delivery controller of FIGS. 1A and 1B.

As shown in FIGS. 2 and 3, DMA operations between the host system 18 and the network interface controller 24 are organized into DMA channels under control of a DMA packet engine, such as a packet DMA engine 220 (interchangeably referred to as a DMA engine 220). DMA packet engine couples to CPU bus 208 via a CPU bus MAC interface, for example, a HyperTransport (HT) MAC 210 shown in FIGS. 2 and 3, which HT MAC 210 can include or may be coupled to a serial to parallel data splitter/demultiplexer (not shown) within network interface controller 24. A DMA channel is comprised of a set of data structures, some of which reside in host memory 22 that includes computer readable medium and instructions that are thereupon stored which when executed by at least one processor, causes the processor to perform steps of FIGS. 5 and 6, and some of which reside in the network interface controller 24. By employing multiple packet DMA engines such as DMA engine 220 with multiple rings, DMA channels can be independently reset, and can be used to extend network quality of service from peripheral I/O devices on the network 112 and/or LAN 114 to the host system 18's DMA system and DMA memory resources 23.

Referring now to FIG. 2, an example application delivery controller 110 including the network interface controller 24 is shown that may be used in the network system 100 depicted in FIG. 1A for managing network traffic (e.g., network packets) using uniquely assigned DMA channels for each executing application, and to perform other functions, for example, implementing network quality of service. In this example, the network interface controller 24 is implemented in a Field-programmable gate array (FPGA), although other specialized hardware could be used, such as application-specific integrated circuits (ASICs). Generally, the network interface controller 24 with network transceiver logic inside is used to bridge network data traffic between host system 18 and one or more high speed input/output (I/O) devices.

In the example shown in FIG. 2, application delivery controller 110 receives network data packets from a network, such as network 112 shown in FIG. 1A. A return DMA operation is performed when the network interface controller 24 uses a DMA channel to move a block of data received from a network (e.g., network 112 or LAN 114) into host memory 22. In this example, the network interface controller 24 connects to a host processor complex, such as host system 18, over CPU bus 202. I/O devices are attached to the network interface controller 24 with interfaces appropriate to each such device. One such device can be an Ethernet port 204 coupled to an Ethernet connection that in this example can be a 10 Gigabit Ethernet connection. The Ethernet port 204 can provide communication with the network 112 as shown in FIG. 1A. The network interface controller 24 provides DMA services to the host system 18 on behalf of its attached I/O devices. DMA services are provided through one or more DMA channels that support respective executing applications and programs. Each DMA channel supports the movement of data traffic between the I/O devices and the host memory 22.

The example shown in FIG. 2 follows the flow of a received network data packet as it arrives at the application delivery controller 110. The network data packet arrives at Ethernet port 204. As further shown in FIG. 2, the network interface controller 24 includes an Ethernet media access control (MAC) 240 and other peripheral interfaces (not shown separately). The Ethernet MAC 240 in this example is coupled to the Ethernet port 204 to receive packets from the network 112 as shown in FIG. 1A.

In one example, network interface controller 24 further includes a QoS to Ring Mapper 252. The QoS to Ring Mapper 252 extends network quality-of-service (QoS) all the way from the network 112 to a CPU complex associated with host processor 20. QoS to Ring Mapper 252 maps the received network data packet to a return DMA ring and carries the QoS from the network 112 to the host system 18 through network interface controller 24. In the following examples, quality of service (QoS) and class of service (CoS) are used interchangeably.

QoS to Ring Mapper 252 inspects each packet to determine its HiGig Destination Port and class of service (CoS) level. The destination port is used as an index into a mapping table to determine which DMA channel should receive the packet. In this example, a table can contain an entry for each of the 32 possible HiGig port values.

QoS to Ring Mapper 252 selects a DMA channel and selects a return DMA ring (e.g., return DMA descriptor ring 328R) based on QoS markings in the received data packet(s) and the peripheral port, such as Ethernet port 204. Once the DMA channel is determined, the CoS value in the packet is used to index into a ring mapping table. Each DMA channel as represented by the packet DMA engine 220 has a unique instance of the ring mapping table. Each ring mapping table contains an entry for each CoS value. The ring mapping table selects which DMA ring within the DMA channel should receive the packet.

Network interface controller 24 also includes packet buffers 256 including, for example, individual buffers/registers 1-4. Packet buffers 256 serve as a queue from which a DMA scheduler 258 chooses packets to go to the packet DMA engine 220. Packet DMA engine 220 monitors the applicable levels in the packet buffers 256 to determine when a return DMA operation should be initiated. The packet buffers 256 are ring-specific. That is, when the QoS to Ring Mapper 252 identifies the DMA channel and DMA ring to which the packets will be sent based on the QoS markings in the packet and based upon the Ethernet port 204 on which the network packet arrives, the specific packet buffer 1-4 in packet buffers 256 and packet DMA engine 220 are identified.

The packet buffers 256 can receive their own programmable minimum and maximum addresses that determine a size of the packet buffers 256. Programmable packet buffer size allows RAM storage to be shifted to match the anticipated requirements of traffic destined for each packet buffer (e.g., individual buffers/registers 1-4 within packet buffers 256). Unused packet buffers can be squeezed down to nothing, and all the RAM space can be allocated to actively used packet buffers. For example, packet buffers receiving low priority, high bandwidth, and delay tolerant traffic can be made very large. Further by way of example, packet buffers receiving high priority, low bandwidth, and delay sensitive traffic can be made small.

DMA scheduler 258 chooses packets out of packet buffers 256 based upon the priority of the queued network data packets and schedules the transfer to the appropriate packet DMA engine 220. For clarity and brevity, only a single packet buffer, a single DMA scheduler, and DMA engine are shown in FIG. 2, but it should be understood that additional packet buffers, DMA schedulers, and DMA engines supporting the independent DMA channels 1-n and associated applications App(1)-App(n) can be included in network interface controller 24.

The packet buffers 256 are selected based on a strict priority scheduling scheme using DMA scheduler 258. The DMA scheduler 258 selects which descriptor ring 1-4 out of return DMA descriptor rings 328R (also referred to as return DMA rings, or send rings) within DMA memory resources 23 to service and the matching packet buffer 256 is accessed for a single packet. The scheduling process is then repeated for the next packet.

Each network packet retrieved from a packet buffer 256 is routed to the appropriate DMA channel controlled by the respective packet DMA engine such as the packet DMA engine 220 in FIG. 2. The DMA channel segments the network packet for delivery to host memory 22 via several, smaller, HyperTransport packets. These HyperTransport packets are interleaved with HyperTransport packets from the other DMA channels in the network interface controller 24.

For host bound packets, the network packets can be parsed and stripped of a HiGig header, the IP and TCP/UDP checksums can be checked, and the packet's length can be determined. Packet data is forwarded to the appropriate packet DMA engine 220 along with additional packet control information. The packet control information is used by the selected packet DMA engine within DMA engine 220 to fill out packet specific fields in a DMA return descriptor in descriptor rings 1-4 of return DMA descriptor rings 328R.

In one example, the network interface controller 24 supports four DMA channels and therefore there are four packet DMA engines each same as DMA engine 220. Each packet DMA engine can be a HyperTransport master and can initiate HyperTransport read and write transactions. The packet DMA engines perform the DMA operations required to move network packets between the attached I/O peripherals and host memory 22. DMA operations can be handled separately for the send (from host) and return (to host) directions.

For the host system 18 to receive a packet, a packet DMA engine such as the packet DMA engine 220 has an available producer descriptor, and a received packet is queued in the packet DMA engine 220. A producer descriptor describes an empty DMA packet buffer 310 in host memory 22. The packet DMA engine 220 pre-fetches producer descriptors from the host system 18 and holds them in a local cache (not shown). The producer descriptors are managed in part by entries in a host status block 308.

The host system 18 monitors the progress of the DMA operations performed by the packet DMA engine 220 via the host status block 308. Each packet DMA engine supports a host status block, such as the host status block 308 associated with the packet DMA engine 220. The host status block 308 contains ring status information for the return DMA descriptor rings 328R associated with the packet DMA engine 220. The host status block 308, in effect, tells the host processor 20 that there are data packets in the return DMA descriptor rings 328R. The host status block 308 can be a data structure in host memory 22 or a physical register or the like, and it is periodically updated by the packet DMA engine 220. The periodicity of these updates is determined by a host coalescing function. Host coalescing is controlled by a programmable set of activity counters and timers.

Packet data information is written to the return DMA descriptor rings 328R and the packet data is written into the DMA packet buffers 310 in host memory 22. The host processor 20, which is monitoring the host status block 308, notices a value change in the host status block 308. Detecting the changed condition, the host processor 20 continues the return DMA operation. The host processor 20 retrieves the DMA descriptor from the return DMA descriptor rings 328R. The DMA descriptor in the return DMA descriptor rings 328R points to the return data buffer and holds other information about the return data. The host processor 20 determines the order in which to service multiple return DMA descriptor rings 328R with pending descriptors, and the host processes the return data. The host processor 20 determines what to do with the network data packet.

During the data DMA, the packet data is mapped into one or more HyperTransport write transactions. When the data DMA operation is complete, the packet DMA engine 220 creates a return descriptor, writes it into the return DMA descriptor rings 328R in host memory 22, and notifies the host system 18. The return descriptor defines the specifics of the return DMA operation. In one example, multiple packet engines similar to DMA engine 220 support multiple return DMA descriptor rings 328R, allowing network quality of service disciplines to be extended into the host system 18's DMA system (including DMA memory resources 23) during receipt of a network data packet from the network.

DMA services are provided through one or more independently resettable DMA channels used by packet DMA engine 220, each DMA channel having its own application and application driver allotted to it. An example network interface controller 24 has four different DMA channels, each supporting the movement of data traffic between the I/O devices and the host system 18's main memory 22. Further by way of example only, each independently resettable DMA channel in the network interface controller 24 can have four quality of service rings, although a higher or a lower number of quality of service rings may be used. These individual rings can be associated with network quality of service levels. Packets can be mapped to the DMA rings based on the one or more Class of Service (CoS) fields/identifiers found in a HiGig header in each packet. The multiple DMA rings allow the network interface controller 24 to coherently extend network based quality of service to host based quality of service.

Each DMA channel in the network interface controller 24 operates independently and is composed of its own private data structures. DMA channels can be assigned to individual host CPUs and/or software threads, independent of other software threads. By way of example, such software threads can be complete applications (App(1)-App(n) shown in FIG. 4) that are allotted to each DMA channel and are independent of each other. By providing independent DMA services to individual software threads, the network interface controller 24 allows for the scaling of system performance when used with multi-core host CPU systems. The isolation created by separate, non-shared, DMA channels also enhances the system's resiliency and redundancy capabilities. Each application on the host system 18 can attach to a DMA channel as its own private application delivery controller device or network interface controller device.

Example Transmitting Data Packets to the Network (Send DMA Operation)

FIG. 3 illustrates the DMA processes used by network interface controller 24 for using multiple independent DMA channels with corresponding multiple applications, where each application has its own driver, and for sending packets over network 112 and/or LAN 114.

As illustrated in FIG. 3, the host system 18 can send a network data packet stored in host memory 22 to the network 112 via network interface controller 24 and Ethernet port 204. A send DMA operation is performed when the host system 18 uses a DMA channel to move a block of data from host memory 22 to a network interface controller peripheral (not shown) via network 112. To perform a send DMA operation, the host processor 20 places the target network data packet into DMA packet buffer 310 and creates a DMA send descriptor (not shown separately) in send DMA descriptor rings 328S. The DMA send descriptor is jointly managed by the host system 18 and the network interface controller 24. The DMA send descriptor includes an address field and length field. The address field points to the start of the target network data packet in DMA packet buffer 310. The length field declares how many bytes of target data are present in the DMA packet buffer 310. The DMA send descriptor also has a set of bit flags (not shown) used to signal additional target data control and status information.

By way of example only, return DMA descriptor rings 328R and send DMA descriptor rings 328S can be physically same hardware memory blocks functioning as return and send DMA rings, respectively, at different times. Alternatively, separate and distinct memory blocks within host memory 22's DMA memory resources 23 may be reserved for each return DMA descriptor rings 328R and send DMA descriptor rings 328S, as can be contemplated by those of ordinary skill in the art after reading this disclosure.

Host system 18 places the send descriptor on the send DMA descriptor rings 328S in host system memory 22. The host processor 20 determines the QoS of the network packet to be transferred to the network 112 and moves the network packet to the appropriate DMA packet buffer 310 and places the descriptor on the appropriate descriptor rings 1-4 in send DMA descriptor rings 328S. The descriptor ring in send DMA descriptor rings 328S is chosen by the host system 18 selects the DMA channel, its associated peripheral, and the QoS level within the DMA channel. Send descriptors created by host system 18 in send DMA descriptor rings 328S can be of variable types, where each descriptor type can have a different format and size. The send DMA descriptor rings 328S is capable of holding descriptors of variable type.

The host processor 20 writes one or more mailbox registers 338 of the network interface controller 24 to notify the network interface controller 24 that the packet is ready. In performing this notification, the host processor 20 performs a write operation to a memory mapped network interface controller register (mailbox register 338). The host processor 20 can report the addition of multiple descriptors onto the send DMA ring in a single update, or alternatively, in multiple updates.

The appropriate packet DMA engine within DMA engine 220 is notified that the packet is ready. The packet DMA engine 220 can be selected from available DMA channels, or if a specific application has a dedicated DMA channel, the associated packet DMA engine 220 for that channel is used. The DMA engine 220 retrieves the DMA descriptor from the send DMA descriptor rings 328S. When multiple descriptors are outstanding in the send DMA descriptor rings 328S, the DMA Engine 220 may retrieve more than one descriptor. Retrieving multiple descriptors at a time maximizes bus bandwidth and hardware efficiency. The DMA engine 220 is capable of receiving and processing send descriptors of variable type, format, and size.

As outlined above, the packet DMA engine 220 monitors the progress of the host DMA operations via a set of mailbox registers 338. Each packet DMA engine 220 supports its own set of mailbox registers 338. The mailbox registers 338 reside in a mapped address space of the network interface controller 24. When appropriate, the host processor 20 accesses the mailbox registers 338 by performing memory mapped read and write transactions to the appropriate target address. The mailbox registers 338 also contain ring status information for the Ring to QoS Mapper 254.

In this send DMA example, the packet DMA engine 220 reads the send descriptor, performs the DMA operation defined by it, and reports to the host system 18 that the DMA operation is complete. During the DMA operation, data is received from one or more CPU Bus read transactions (e.g., HyperTransport or PCI Express read transactions).

Ring to QoS Mapper 254 examines the assigned send DMA ring in send DMA descriptor rings 328S and receives packet data and packet control information from the packet DMA engine 220. Using the control information, the Ring to QoS Mapper 254 stamps the appropriate QoS onto the network data packet, thereby allowing host system 18 to send the network data packet back to the network 112. For example, using the control information, the Ring to QoS Mapper 254 can create and prepend a HiGig header to the packet data.

An egress DMA routing interface 238 arbitrates access to the network for DMA send packets. When a Ring to QoS Mapper 254 has a network packet ready to send, the egress DMA routing interface 238 arbitrates its access to the Ethernet port 204 and routes the packet to the correct interface if there is more than one present in the network interface controller 24. The egress DMA routing interface 238 behaves like a crossbar switch and monitors its attached interfaces for available packets. When a packet becomes available, the egress DMA routing interface 238 reads the packet from the selected ring to QoS mapper 254 and writes it to the destination interface. The egress DMA routing interface 238 moves complete packets to Ethernet MACs 240. When multiple sources are contending for egress DMA routing interface 238, the egress DMA routing interface 238 uses a fair round-robin arbitration scheme based on last packet transmission, although other arbitration schemes, for example, a weighted round-robin, may be used. According to one example, the arbitration scheme implemented by egress DMA routing interface 238 is fair on a per packet basis, not on a byte basis.

The network interface controller 24 provides DMA services to a host complex such as the host system 18 in FIGS. 2 and 3 on behalf of its attached I/O devices such as the Ethernet port 204. DMA operations involve the movement of data between the host memory 22 and the network interface controller 24. The network interface controller 24 creates and manages HyperTransport or other types of CPU Bus read/write transactions targeting host memory 22. Data transfer sizes supported by DMA channels maintained by various components of application delivery controller 110 are much larger than the maximum HyperTransport or CPU bus transaction size. The network interface controller 24 segments single DMA operations into multiple smaller CPU Bus or HyperTransport transactions. Additionally, the network interface controller 24 creates additional CPU bus or HyperTransport transactions to support the transfer of data structures between the network interface controller 24 and host memory 22.

In one example, multiple packet DMA engines similar to packet DMA engine 220 support multiple send DMA descriptor rings 328S, allowing network quality of service disciplines to be extended from the host system 18's DMA system (including DMA memory resources 23) through to the peripheral I/O devices attached to or on the network 112.

In both return and send operations, multiple DMA rings (e.g., send DMA descriptor rings 328S and return DMA descriptor rings 328R) allow the network interface controller 24 to coherently extend network based quality of service to host based quality of service. Extending the quality of service involves a number of processes in the network interface controller 24.

One example process is a packet to DMA ring mapping. Packet to DMA ring mapping occurs in both receiving and transmitting packets to/from the host system 18. In the case of receiving network data packets from a network and routing them to the host system 18, the received packets are inspected by the QoS to Ring Mapper 252 in the network interface controller 24. A class of service (CoS) field is present in a HiGig header in each field of the received network data packet. The CoS field is used to select a DMA return ring in return DMA descriptor rings 328R, such as those associated with packet DMA engine 220 in FIG. 2.

In the case of transmitting network data packets from the host system 18 out to network 112, the transmitted packets from the host system 18 are placed in a send DMA descriptor rings 328S such as one of the send DMA rings 1-4 in FIG. 3. The CoS value assigned to the send DMA ring transmitting the packet is then stamped into the CoS field of the HiGig header of the packet.

Another example process that occurs involves buffering of received data packets. Received packets are buffered based on the assigned return DMA ring within return DMA descriptor rings 328R. Since the return DMA rings are assigned based on network quality of service settings, the buffering is quality of service based. Packet dropping occurs when a packet buffer 1-4 within DMA packet buffers 256 overflows and is limited to the overflowing buffer. Other buffers and quality of service levels are unaffected by such an overflow. It is to be noted that although 4 buffers are shown in DMA packet buffers 256, a higher or lower number of individual buffers may be used.

Figure 4:
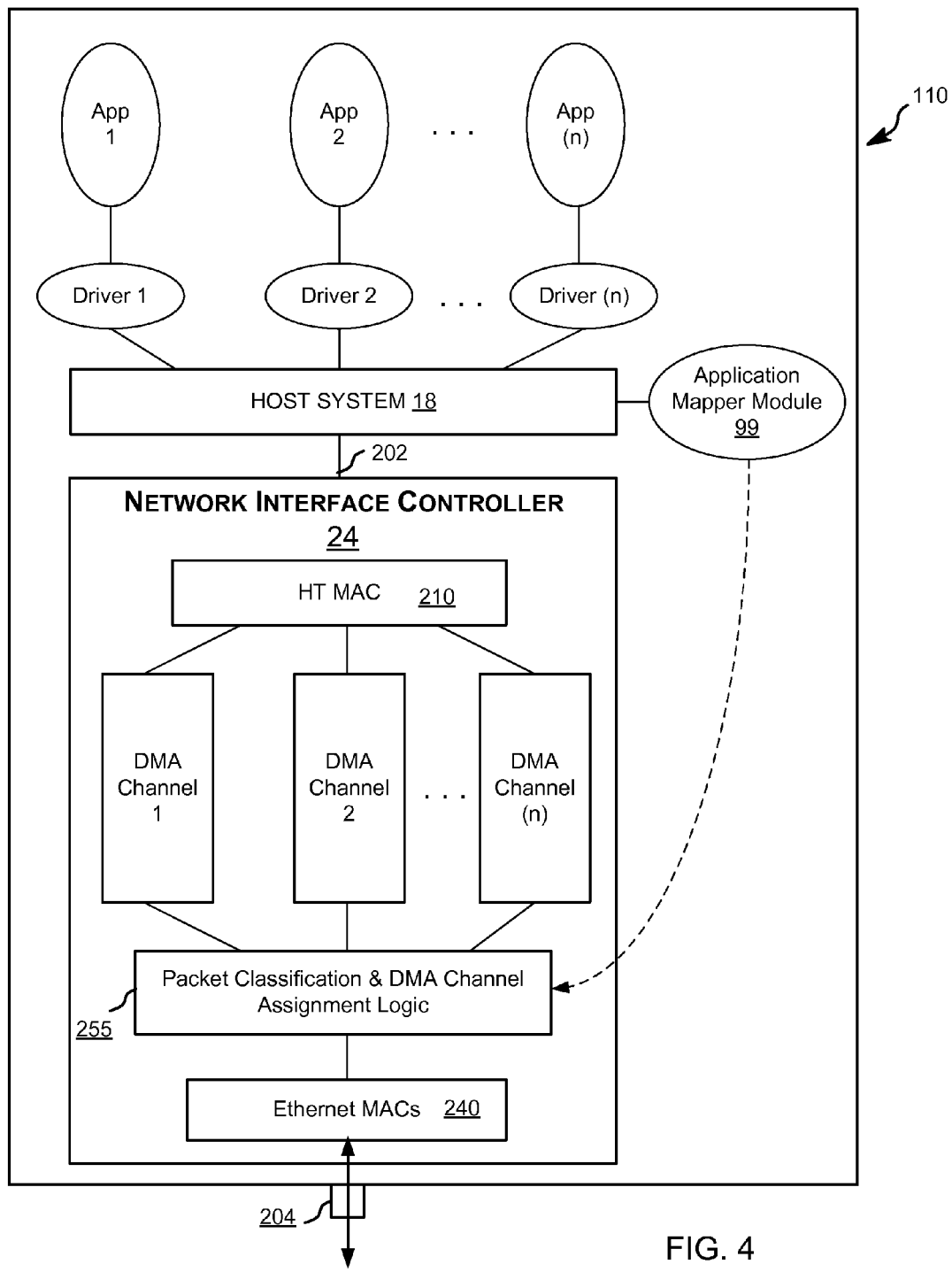
FIG. 4 is a partly functional and partly schematic diagram of independent DMA channels and plurality of applications with associated plurality of independent application drivers in the application delivery controller of FIGS. 1A and 1B.

FIG. 4 illustrates further details of application delivery controller 110 with a plurality of independent applications App(1)-App(n) being executed by one or more processors (e.g., host processor 20) in host system 18. Each application in the plurality of applications App(1)-App(n) has its own respective application driver shown as Driver 1, Driver 2, . . . , Driver 'n' associated with the respective application, where the index n denotes an unlimited number of executing applications and drivers. Applications App(1)-App(n) send and receive data packets from and to the network 112 (and/or LAN 114), respectively, using respective DMA channels (e.g., DMA channels 1-*n*). DMA channels 1-*n* are uniquely assigned to individual applications out of App(1)-App(n). In this example, drivers 1-*n* manage access to respective DMA channels 1-*n* and do not require knowledge of each other or a common management database or entity (e.g., a hypervisor). By way of example only, each of applications App(1)-App(n) can be independent instances of different applications, or alternatively, may be independent instances of the same application, or further, may be different operating systems supported by different processors in host system 18 (e.g., host processor 20).

DMA channels 1-*n* each have unique independent resources allotted to them, for example, a unique PCI bus identity including a configuration space and base address registers, an independent view of host system memory 22, a unique set of DMA descriptor ring buffers (e.g., buffers in return DMA descriptor ring 328R and send DMA descriptor ring 328S), a unique set of packet buffers (e.g., buffers in packet buffers 256), unique DMA request/completion signaling (through interrupts or polled memory structures), and other resources. Each of DMA channels 1-*n* is unique and independent thereby permitting management by separate unique drivers 1-*n*.

The network interface controller 24 classifies received packets to determine destination application selected from applications App(1)-App(n) and thereby selects the matching DMA channel to deliver the packet to the corresponding application. By way of example only, packet classification includes reading packet header fields thereby permitting application identification. Further by way of example only, packet classification includes hash calculation for distribution of packets across multiple instances of the same application, and/or reading a cookie stored, for example, in the network interface controller 24 associated with the application and the received network packet. According to one example, packet classification and mapping to DMA channels is configured in the network interface controller 24 by an application mapper module 99. Application mapper module 99 can be an independently executing application running, for example, on host processor 20 that manages a mapping table mapping ports in Ethernet port 204 to DMA channels 1-*n* stored on the network interface controller 24. Application mapper module 99 communicates with network transceiver logic such as packet classification and DMA channel assignment logic 255, which can include, by way of example only, one or more of QoS to Ring Mapper 252, packet buffer 256, Ring to QoS mapper 254, and egress DMA routing interface 238, in addition to other hardware and logic components, to maintain the mapping between the network packets and the DMA channels 1-*n*.

A similar process for allotting DMA channels 1-*n* for transmitting network packets includes packets inherently being transmitted based on a source application among App(1)-App(n) that has an allotted DMA channel among DMA channels 1-*n*. Network traffic from all DMA channels is combined at Ethernet MAC 240 for transmission to the network 112 via one or more of Ethernet ports 204. According to an example, packets assembled during the transmitting (as explained above in FIG. 3), are allotted DMA channels by the application mapper module 99 and packet classification and DMA channel assignment logic 255 based upon, for example, a mapping table, a cookie stored in the application delivery controller 110, or a header value in the assembled packet. It is to be noted that although DMA channels 1-*n* are shown in the network interface controller 24, DMA channels 1-*n* are maintained by both network interface controller 24 and host system 18, as explained above in the receive and transmit scenarios of FIGS. 2 and 3, respectively.

Figure 5:
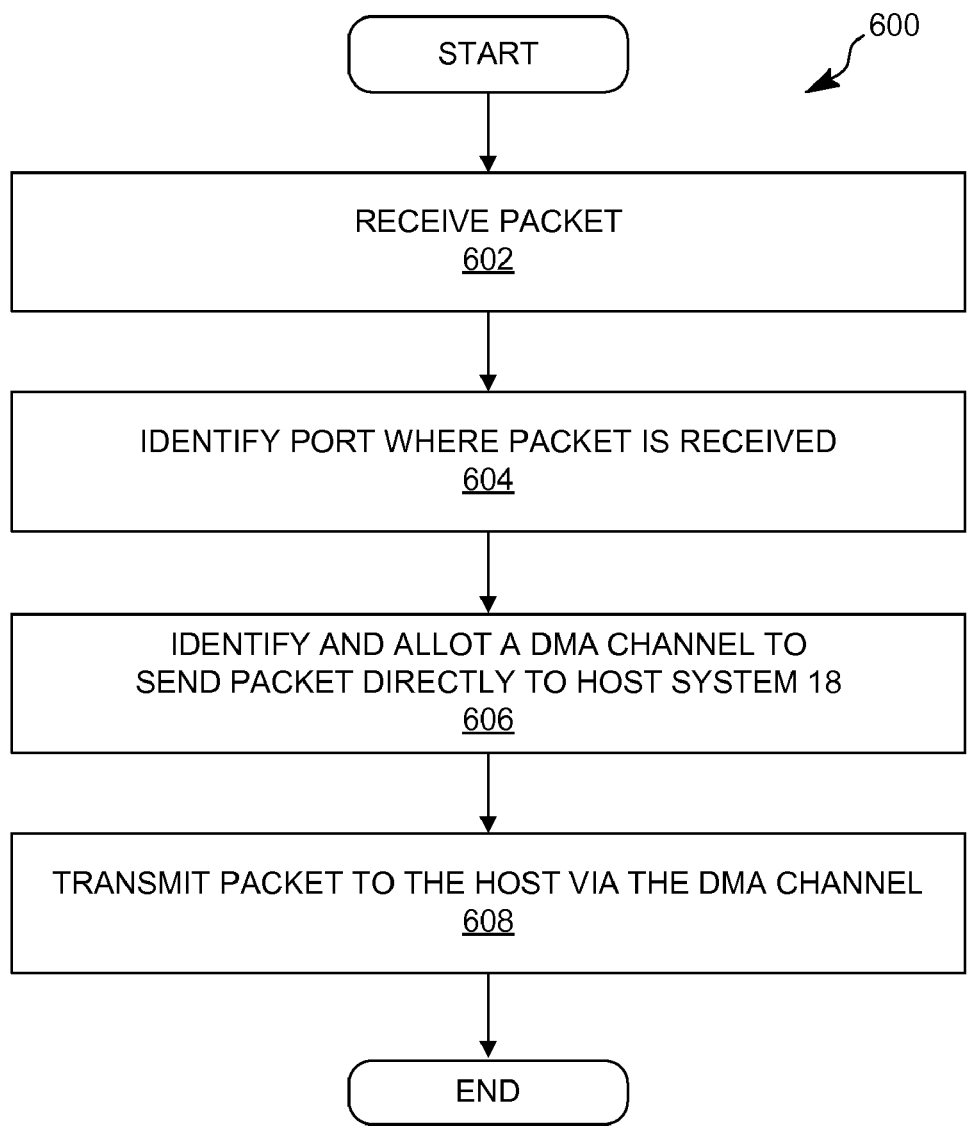
FIG. 5 is a flow chart for handling a packet received by the application delivery controller of FIG. 2.
Figure 6:
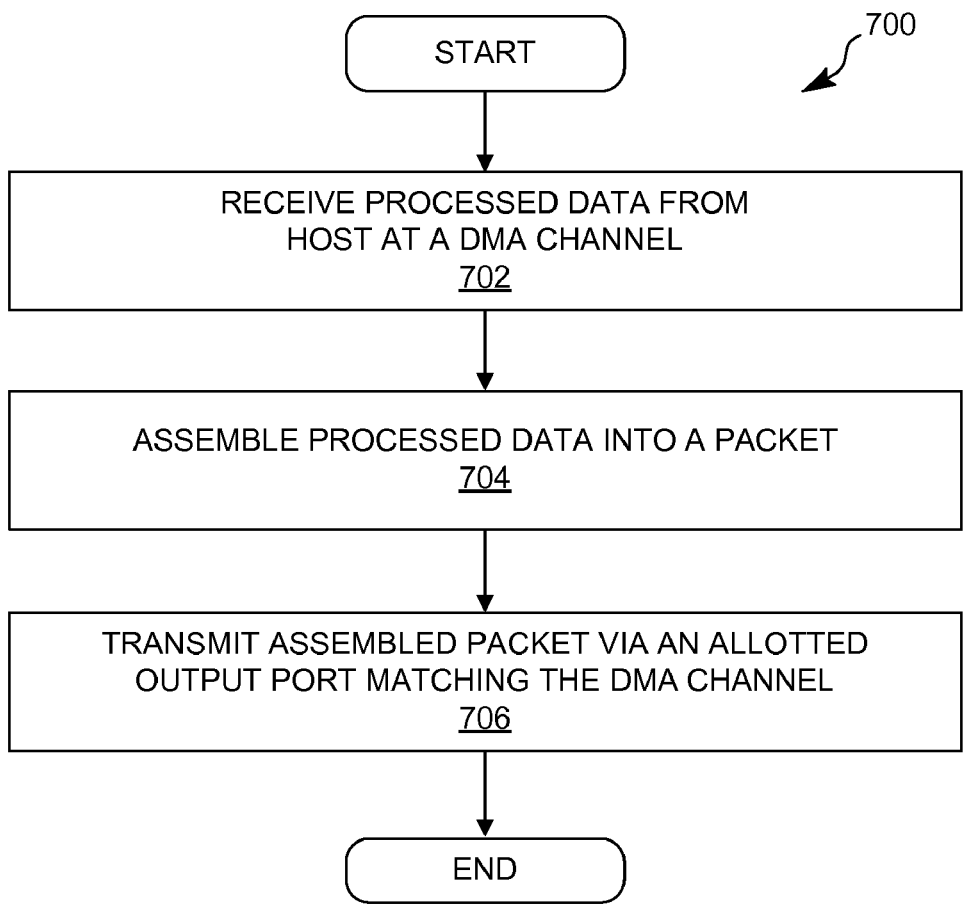
FIG. 6 is a flow chart for handling a packet to be sent by the application delivery controller to the network by the high speed bridge logic in FIG. 3.

The operation of an example process for communicating with networked clients and servers through a network device shown in FIGS. 1A-4, which may be run on the application delivery controller 110, will now be described with reference back to FIGS. 1A-4 in conjunction with the flow diagrams shown in FIGS. 5-6. The flow diagrams in FIGS. 5-6 are representative of example machine readable instructions for implementing the application delivery controller 110 and/or the process of communicating with networked clients and servers through a network device, e.g., application delivery controller 110. In this example, the machine readable instructions comprise an algorithm for execution by: (a) a processor, (b) a controller, and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the application delivery controller 110 could be implemented by software, hardware, and/or firmware. Also, some or all of the machine readable instructions represented by the flowchart of FIGS. 5-6 may be implemented manually. Further, although the example algorithm is described with reference to the flowcharts illustrated in FIGS. 5-6, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Referring now to FIG. 5, the process begins in the application delivery controller 110 in step 602, where a network packet is received from the network 112 (or, LAN 114) at one of the ports in Ethernet ports 204. In step 604, the port at which the network packet arrives is identified by a port value. In step 606, the identified port value is used as an index into a mapping table stored in the application delivery controller 110 and maintained by the application mapper module 99 to identify which DMA channel out of DMA channels 1-n should be allotted to the received network packet. Alternatively, a hash value, a cookie stored on the application delivery controller 110, a header value in the received packet may also be used by the application mapper module 99 to allot one of DMA channels 1-n to the received packet. In step 608, once one of DMA channels 1-n have been allotted, the received packet is sent for further processing by the applications App (1)-App(n) executing on host system 18.

According to one aspect of the technology described herein, the mapping table maybe stored in a buffer inside application delivery controller 110. Upon arrival of the packet, the network interface controller 24 within application delivery controller 110 may send an indication signal to host memory 22 and/or host system processor 20 about the arrival of the packet and may receive an acknowledgement in return from the host system processor 20 regarding the receipt of the indication signal. After the DMA channel has been allotted, the received packet can be segmented into smaller Hyper Transport packet, as described above, and sent across CPU bus 202 in an interleaved manner for use, for example, by applications App(1)-App(n) executing on host system 18. A buffer in host system memory 22 (e.g., return DMA descriptor ring 328R) can be allotted to the allotted DMA channel to temporarily store the Hyper Transport packet while it is waiting to be used by the respect one of the applications executing on the host system 18.

Referring to FIG. 6, transmission of CPU bus packets (e.g., HyperTransport packets) stored in the host system 18 of application delivery controller 110 to network 112 or LAN 114 is described. In step 702, data packets associated with an executing application (e.g., one of App(1)-App(n)) in an interleaved manner are received by network interface controller 24 from host system 18 over CPU bus 202. According to one example, the process in step 702 can be triggered when the network interface controller 24 receives an indication of a memory location in the application deliver controller 110 that one of the plurality of applications App(1)-App(n) is ready to transmit a network data packet, and in return sends an acknowledgment to the executing application that attempts to send the data packet after the data packet has been transmitted to network 12 (or, LAN 114). The HT MAC 210 sends the data packets over one of the allotted DMA channels 1-n depending upon which application out of App(1)-App(n) the data packets received over the CPU bus 202 are associated with. In one example, the allotted DMA channel can be the same as the DMA channel over which the data packet was earlier received, or it may be a second DMA channel separate and independent from the earlier allotted DMA channel. In step 704, received Hyper Transport data packets from CPU bus 202 are assembled into a corresponding network packet suitable for transmission. In step 706, assembled network packets are transmitted to network 112 (or, LAN 114) via one of the MAC ports in Ethernet MACs 240 and subsequently a port in Ethernet ports 204 allotted based upon the mapping table corresponding to the DMA channel on which the packet was assembled, although other types of ports could also be used.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. For example, different non-TCP networks may be selected by a system administrator. The order that the measures are implemented may also be altered. These alterations, improvements, and modifications are intended to be suggested hereby, and are within the spirit and scope of the examples. Additionally, the recited order of processing elements or sequences, or the use of numbers, letters, or other designations therefore, is not intended to limit the processes to any order.

What is claimed is:

1. A method for communicating with networked clients and servers through a network device, the method comprising:
   establishing a plurality of direct memory access (DMA) channels across a host system bus over which a plurality of executing applications having respective application drivers communicate with a network through a network device configured to receive and transmit network data packets;
   receiving, at a first port in the network device, a first network data packet destined for an executing application;
   identifying a first DMA channel over which to transmit the first network data packet towards the destined executing application; and
   transmitting the first network data packet to the destination executing application over the designated DMA channel mapping to the first port, wherein the respective application drivers are independent from other application drivers associated with other executing applications in the plurality of executing applications, and wherein the respective application drivers independently manage access to a corresponding DMA channel such that each DMA channel in the plurality of DMA channels is independent of the other DMA channels and has unique independent allotted resources.

2. The method as set forth in claim 1, wherein the identifying is based on a mapping between the first port and a DMA channel designated for use by the executing application.

3. The method as set forth in claim 2, wherein the mapping between the first port and the designated DMA channel is stored by the network device.

4. The method as set forth in claim 2, wherein the mapping is further based on at least one of a hash value, a cookie stored in the network device, and a header value of the first network packet.

5. The method as set forth in claim 2, wherein the identifying comprises allotting a host system memory buffer to the designated DMA channel to temporarily store the first network data packet.

6. The method as set forth in claim 1, wherein network transceiver logic within the network device provides the destination executing application with an indication that the first network data packet has been received.

7. The method as set forth in claim 6, wherein the network transceiver logic receives an acknowledgment signal from the destination executing application responsive to the transmitting of the first network data packet to the destination executing application.

8. The method as set forth in claim 1 further comprising:
receiving, at a network interface controller in the network device, a plurality of segmented bus packets corresponding to a second network data packet from at least one of the destination executing application over a second designated DMA channel;
assembling the segmented bus packets into the second network data packet; and
transmitting the second network data packet to the network via a second port in the network device mapping to the second designated DMA channel.

9. The method as set forth in claim 8 further comprising:
allocating the second designated DMA channel to the second port based on at least one of a hash value, a cookie stored in the network interface controller, and a header information in the assembled second network data packet.

10. The method as set forth in claim 8 further comprising:
updating a memory location stored in the network device to indicate one of the plurality of executing applications is ready to transmit the second network data packet.

11. The method as set forth in claim 10, wherein network transceiver logic in the network device sends an acknowledgment to the one of the plurality of executing applications that the second network data packet has been transmitted to the network.

12. A tangible computer readable medium having stored thereon instructions for communicating with networked clients and servers through a network device comprising machine executable code which when executed by at least one processor, causes the processor to perform steps comprising:
establishing a plurality of direct memory access (DMA) channels across a host system bus over which a plurality of executing applications having respective application drivers communicate with a network through a network device configured to receive and transmit network data packets;
receiving, at a first port in the network device, a first network data packet destined for an executing application;
identifying a first DMA channel over which to transmit the first network data packet towards the destined executing application; and
transmitting the first network data packet to the destination executing application over the designated DMA channel mapping to the first port, wherein the respective application drivers are independent from other application drivers associated with other executing applications in the plurality of executing applications, and wherein the respective application drivers independently manage access to a corresponding DMA channel such that each DMA channel in the plurality of DMA channels is independent of the other DMA channels and has unique independent allotted resources.

13. The tangible computer medium as set forth in claim 12, wherein the identifying is based on a mapping between the first port and a DMA channel designated for use by the executing application.

14. The tangible computer medium as set forth in claim 13, wherein the mapping between the first port and the designated DMA channel is stored by the network device.

15. The tangible computer medium as set forth in claim 13, wherein the mapping is further based on at least one of a hash value, a cookie stored in the network device, and a header value of the first network packet.

16. The tangible computer medium as set forth in claim 13, wherein the identifying comprises allotting a host system memory buffer to the designated DMA channel to temporarily store the first network data packet.

17. The tangible computer medium as set forth in claim 12, wherein network transceiver logic within the network device provides the destination executing application with an indication that the first network data packet has been received.

18. The tangible computer medium as set forth in claim 17, wherein the network transceiver logic receives an acknowledgment signal from the destination executing application responsive to the transmitting of the first network data packet to the destination executing application.

19. The tangible computer medium as set forth in claim 12, wherein the machine executable code which when executed by at least one processor, causes the processor to further perform steps comprising:
receiving, at a network interface controller in the network device, a plurality of segmented bus packets corresponding to a second network data packet from at least one of the destination executing application over a second designated DMA channel;
assembling the segmented bus packets into the second network data packet; and
transmitting the second network data packet to the network via a second port in the network device mapping to the second designated DMA channel.

20. The tangible computer medium as set forth in claim 19, wherein the machine executable code which when executed by at least one processor, causes the processor to further perform steps comprising:
allocating the second designated DMA channel to the second port based on at least one of a hash value, a cookie stored in the network interface controller, and a header information in the assembled second network data packet.

21. The tangible computer medium as set forth in claim 19, wherein the machine executable code which when executed by at least one processor, causes the processor to further perform steps comprising:
updating a memory location stored in the network device to indicate one of the plurality of executing applications is ready to transmit the second network data packet.

22. The tangible computer medium as set forth in claim 21, wherein network transceiver logic in the network device sends an acknowledgment to the one of the plurality of executing applications that the second network data packet has been transmitted to the network.

23. An application delivery controller comprising:
one or more processors;
a memory coupled to the one or more processors by a bus;
a network interface controller coupled to the one or more processors and the memory and configured to be capable of receiving and forwarding data packets from a network that relate to a plurality of applications; and
at least one of the one or more processors configured to execute programmed instructions stored in the memory and the network interface controller with logic configured to implement:
establishing a plurality of direct memory access (DMA) channels across a host system bus over which a plurality of executing applications having respective application drivers communicate with a network through a network device configured to receive and transmit network data packets,
receiving, at a first port in the network device, a first network data packet destined for an executing application, identifying a first DMA channel over which to transmit the first network data packet towards the destined executing application, and transmitting the first network data packet to the destination executing application over the designated DMA channel mapping to the first port, wherein the respective application drivers are independent from other application drivers associated with other executing applications in the plurality of executing applications, and wherein the respective application drivers independently manage access to a corresponding DMA channel such that each DMA channel in the plurality of DMA channels is independent of the other DMA channels and has unique independent allotted resources.

24. The application delivery controller of claim 23, wherein the identifying is based on a mapping between the first port and a DMA channel designated for use by the executing application.

25. The application delivery controller of claim 24, wherein the mapping between the first port and the designated DMA channel is stored by the network device.

26. The application delivery controller of claim 24, wherein the mapping is further based on at least one of a hash value, a cookie stored in the network transceiver logic, and a header value of the first network packet.

27. The application delivery controller of claim 24, wherein the identifying comprises allotting a host system memory buffer to the designated DMA channel to temporarily store the first network data packet.

28. The application delivery controller of claim 23, wherein network transceiver logic within the network device provides the destination executing application with an indication that the first network data packet has been received.

29. The application delivery controller of claim 28, wherein the network transceiver logic receives an acknowledgment signal from the destination executing application responsive to the transmitting of the first network data packet to the destination executing application.

30. The application delivery controller of claim 23, wherein the network transceiver logic is further configured to implement:

receiving, at the network interface controller in the network device, a plurality of segmented bus packets corresponding to a second network data packet from at least one of the destination executing application over a second designated DMA channel, assembling the segmented bus packets into the second network data packet, and transmitting the second network data packet to the network via a second port in the network device mapping to the second designated DMA channel.

31. The application delivery controller of claim 30, wherein the network transceiver logic is further configured to implement:

allocating the second designated DMA channel to the second port based on at least one of a hash value, a cookie stored in the network interface controller, and a header information in the assembled second network data packet.

32. The application delivery controller of claim 30, wherein the network transceiver logic is further configured to implement:

updating a memory location stored in the network device to indicate one of the plurality of executing applications is ready to transmit the second network data packet.

33. The application delivery controller of claim 32, wherein network transceiver logic in the network device sends an acknowledgment to the one of the plurality of executing applications that the second network data packet has been transmitted to the network.

* * * * *